(12) United States Patent
Hong et al.

(10) Patent No.: US 8,874,577 B2
(45) Date of Patent: Oct. 28, 2014

(54) SYSTEM AND METHOD FOR TRIAGING OF INFORMATION FEEDS

(75) Inventors: Lichan Hong, Mountain View, CA (US); Gregorio Convertino, Palo Alto, CA (US); Bongwon Suh, Cupertino, CA (US); Ed H. Chi, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 269 days.

(21) Appl. No.: 12/646,846

(22) Filed: Dec. 23, 2009

(65) Prior Publication Data

US 2011/0153646 A1 Jun. 23, 2011

(51) Int. Cl.
*G06F 7/00* (2006.01)
*G06F 17/30* (2006.01)

(52) U.S. Cl.
CPC ...... *G06F 17/3089* (2013.01); *G06F 17/30651* (2013.01)
USPC .......................................... 707/737; 707/738

(58) Field of Classification Search
CPC .................... G06F 17/30648; G06F 17/30651
USPC ........................................ 707/708, 737, 738
See application file for complete search history.

(56) References Cited

U.S. PATENT DOCUMENTS

| | | | |
|---|---|---|---|
| 7,519,589 B2 | 4/2009 | Charnock et al. | |
| 8,375,024 B2 * | 2/2013 | Goeldi | 707/722 |
| 8,386,509 B1 | 2/2013 | Scofield et al. | |
| 2002/0062368 A1 | 5/2002 | Holtzman et al. | |
| 2005/0080856 A1 | 4/2005 | Kirsch | |
| 2006/0026152 A1 | 2/2006 | Zeng et al. | |
| 2006/0271526 A1 | 11/2006 | Charnock et al. | |
| 2007/0027932 A1 * | 2/2007 | Thibeault | 707/200 |
| 2007/0083468 A1 * | 4/2007 | Wetherell | 705/51 |
| 2007/0094247 A1 * | 4/2007 | Chowdhury et al. | 707/4 |
| 2007/0198459 A1 * | 8/2007 | Boone et al. | 707/1 |
| 2008/0281915 A1 | 11/2008 | Elad et al. | |
| 2009/0150514 A1 | 6/2009 | Davis et al. | |
| 2010/0235235 A1 * | 9/2010 | Hosseini et al. | 705/14.49 |

OTHER PUBLICATIONS

Baumer et al., "Smarter Blogroll: An Exploration of Social Topic Extraction for Manageable Blogrolls," Proceedings of the 41st Hawaii International Conference on System Sciences (2008).
M. A. Hearst, "UIs for Faceted Navigation: Recent Advances and Remaining Open Problems," Proc. 2008 Workshop on Human-Computer Interaction and Information Retrieval (2008).
Hearst et al., "What Should Blog Search Look Like?" Proc. 2008 ACM Workshop on Search in Social Media, pp. 95-98 (2008).
Neustaedter et al., "Beyond "From" and "Received": Exploring the Dynamic of Email Triage," Proc. CHI '05, pp. 1977-1980 (2005).
Whittaker et al., "Email Overload: Exploring Personal Information Management of Email," Proc. CHI '96, pp. 276-283 (1996).

(Continued)

*Primary Examiner* — Mariela Reyes
(74) *Attorney, Agent, or Firm* — Patrick J.S. Inouye; Krista A. Wittman

(57) ABSTRACT

A system and method for triaging of information feeds is provided. A plurality of information feeds are received. At least one topic is identified from each information feed. At least one topic is presented to a user in topic facet including a plurality of identified topics. A selection of one of the plurality of topics is received from the user. The user interface is updated to display only the feeds that contain the selected topic.

22 Claims, 7 Drawing Sheets

(56) References Cited

OTHER PUBLICATIONS

Xu et al., "Query Expansion using Local and Global Document Analysis," Poc. SIGIR '96, pp. 4-11 (1996).

F. Oliveira, "Stop Using Your RRS Reader," http://helloform.com/blog/2009/01/stop-using-your-rss-reader (Jan. 13, 2009).

A. Mukherjee, "8 Useful Tips to Manage and Avoid RSS Overload," http://www.dumblittleman.com/2008/06/8-6ways_to_filter_your_rss_feeds.php (May 29, 2008).

J. Catone, "6 Ways to Filter Your RSS Feeds," http://www.readwriteweb.com/archives/6_ways_to_filter_your_rss_feeds.php (Mar. 4, 2008).

S. Whittaker, "Supporting Collaborative Task Management in E-mail," Human-Computer interaction, vol. 20, pp. 49-88 (2005).

Yee et al., "Faceted Metadata for Image Search and Browsing," Proc. CHI '03, pp. 401-408 (2003).

M. Dörk, et al., in VisGets: Coordinated Visualizations for Web-based Information Exploration and Discover, IEEE Trans. on Visualization and Computer Graphics (vol. 14, No. 6, 1205-1212, 2008).

Paige H. Adams and Craig H. Martell "Topic Detection and Extraction in Chat", 2008 IEEE International Conference.

\* cited by examiner

SYSTEM AND METHOD FOR TRIAGING OF INFORMATION FEEDS

FIELD

This application relates in general to management of electronic information, and in particular, to a system and method for triaging of information feeds.

BACKGROUND

Information overload is a growing concern as the amount of information sources available and received electronically, for example, through the Internet has exponentially gown. People face the challenge of keeping track of numerous streams of information from a variety of sources, such as email messages from work colleagues and friends, news stories, status updates from networking sites, and changes to shared electronic files, such as documents in content management systems. Each of the information sources can require visiting a different Web site or tool, including input of a separate username and password to access each source.

Really Simple Syndication (RSS) was developed as a way to avoid the time and effort needed to manually visit each information source individually. RSS is Web-based format for publishing content and allows feed reader applications to gather information published using RSS from a variety of sources and to present the information to a user for monitoring and review. The feed reader application regularly collects information updates from sources, or feeds, subscribed to by the user of the feed reader. Unfortunately, subscribing even to a few feeds can quickly lead to feed overload. Reviewing hundreds or thousands of feed items can be daunting and identifying any feed items of particular interest to the user can be lost in the noise.

Conventional feed readers, such as Google Reader and FriendFeed, allow users to narrow the amount of feed items to review by showing only the feeds of particular people or from particular sources, but not in combination. Another approach, suggested by Marian Dörk, et al., in VisGets: Coordinated Visualizations for Web-based Information Exploration and Discover, IEEE Trans. on Visualization and Computer Graphics (Vol. 14, No. 6, 1205-1212, 2008), organizes feeds along three dimensions, time, location, and tags within a faceted browser interface. However, the approach assumes that the time, location, and tag information are already associated with the feed item, while, practically, many feed items do not include tag data about the content of the feed item.

Accordingly, there is a need for management of information feeds which includes identifying topics from the content of the information feeds.

SUMMARY

Facet information is extracted from information feeds, which is then displayed as facets in a user interface, such as a Web browser. Facet information, such as creator, source, topic, and time can be identified directly from content of the information feed or information related to the feed. A user can select one or more selectable elements in the facets to filter out a portion of the information feeds. The facets are dynamically updated based on the remaining, or unfiltered, feeds.

An embodiment provides a system and method for triaging of information feeds. A plurality of information feeds are received. At least one topic is identified from each information feed. At least one topic is presented to a user in topic facet including a plurality of identified topics. A selection of one of the plurality of topics is received from the user. The user interface is updated to display only the feeds that contain the selected topic.

Still other embodiments of the present invention will become readily apparent to those skilled in the art from the following detailed description, wherein is described embodiments of the invention by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Figure 1:
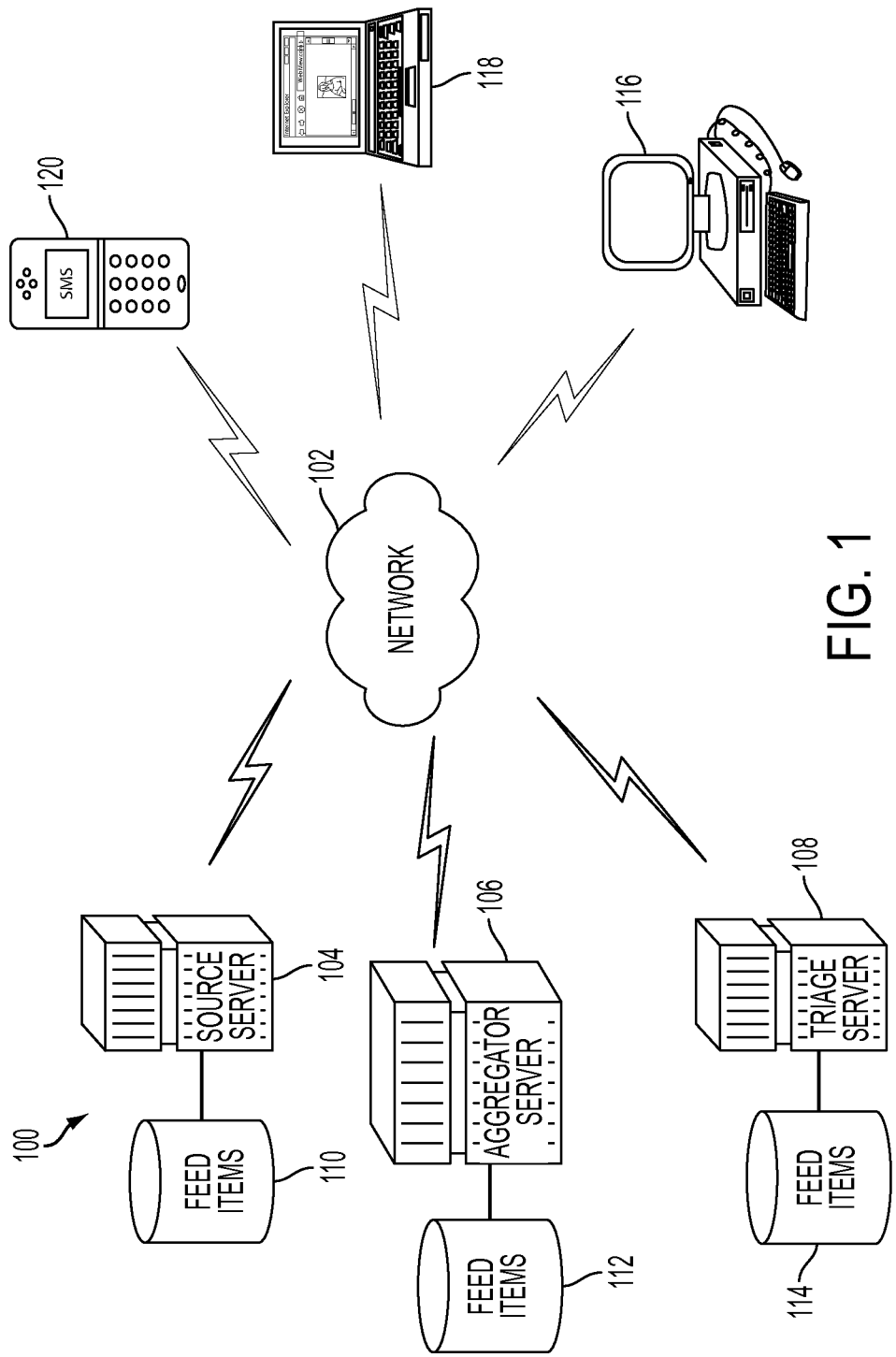
FIG. 1 is a block diagram showing a system for triaging of information feeds, in accordance with one embodiment.

Information overload can lead to unmanageable or difficult to find content of interest to a user. Management of information feeds through faceted browsing can lead to more efficient review and location of content as well as encouraging serendipitous discovery of information. Information feeds can be managed through dynamically updated facets in a user interface. FIG. 1 is a block diagram 100 showing a system for triaging of information feeds, in accordance with one embodiment. A digital data communications network 102, such as the Internet, provides an infrastructure for exchange of digital information. Other digital information exchange infrastructures, for instance, a non-public corporate enterprise network, are possible. The network 102 provides interconnectivity to diverse and distributed information sources and users that respectively supply and consume the digital information. Users continually post articles, Web pages, send emails, and the like to the network 102, which are maintained as a distributed data corpus through one or more source servers 104, feed aggregator servers 106, triage servers 108, and other data repositories that serve as information sources. These sources respectively serve feed items 110, 112, 114, and other information to users that access the network 102 through user devices 116, 118, 120. User devices can include desktop personal computers 116, laptop personal computers 118, and handheld devices, such as mobile telephones and mobile Internet devices 120.

In general, each user device 116, 118, 120 is a Web-enabled device that executes a Web browser or similar application, which supports interfacing to and information exchange and retrieval with the servers 104, 106, 108. Both the user devices 116, 118, 120 and servers 104, 106, 108 include components conventionally found in general purpose programmable computing devices, such as a central processing unit, memory, input/output ports, network interfaces, and non-volatile storage, although other components are possible. The devices 104, 106, 108, 116, 118, 120 can include one or modules for carrying out the embodiments disclosed herein.

The modules can be implemented as a computer program or procedure written as source code in a conventional programming language and presented for execution by the central processing unit as object or byte code. Alternatively, the modules could also be implemented in hardware, either as integrated circuitry or burned into read-only memory components. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components. Moreover, other information sources in lieu of or in addition to the servers 104, 106, 108, and other information consumers, in lieu of or in addition to user devices 116, 118, 120, are possible.

Feed items 110, 112, 114 are created by users or automatically generated, and can include emails, news content, status updates from networking sites, such as Facebook and Twitter, and notifications of changes to electronic files, such as documents in content management systems. Other types of feed items are possible. Feed items can be received directly on user devices 116, 118, 120 for user review via a user interface from a source server 104 or feed items from many sources' can be aggregated, cached, and accessed by user devices 116, 118, 120 from other servers 106, 108.

Information is extracted from the feed items 110, 112, 114 and used to populate facets in a browser as user selectable elements. The extracted information can include information regarding the creator, source, time, and topics of the feed items 110, 112, 114. The facets and feed items are displayed to the user for review and manipulation. The user can select one or more of the elements to filter, or winnow, the feed items 110, 112, 114 displayed down to the selected elements, as further discussed below beginning with FIG. 2.

Figure 2:
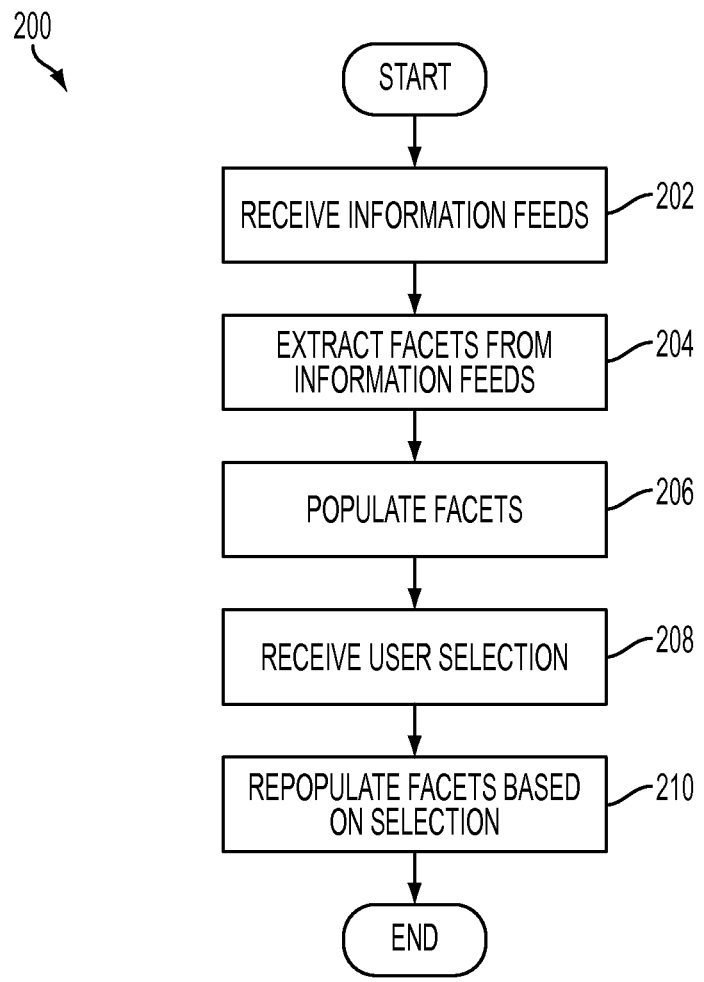
FIG. 2 is a flow diagram showing a method for triaging information feeds, in accordance with one embodiment.

Information feeds can be filtered based on one or more facets extracted from the feeds. FIG. 2 is a flow diagram 200 showing a method for triaging of information feeds, in accordance with one embodiment. Information feeds are received (block 202) from feed sources. The feeds can be received from a feed aggregator 106, for example, through the FriendFeed application programming interface (API), or directly from the feed sources 104 and organized for presentation in the user interface. Other ways of aggregating feeds are possible.

Facet information is extracted from the information feeds (block 204). Facet information can include, for example, username of the creator of the information feed item, source that the feed item was received from, the time the feed item was created, and topics contained in the feed item. Other types of facet information are possible. In one embodiment, creator, source, and time information are extracted directly from the feed item, while topic information is determined from the content of the feed item.

Topics can be determined in a number of ways. In one embodiment, a part-of-speech tagger, such as the Stanford tagger, available at http://nlp.stanford.edu/software/tagger.shtml, can be used to identify nouns and noun phrases appearing in the content of each feed item. The number of occurrences of each noun and noun phrase across all feed items is aggregated, with the top n nouns and noun phrases appearing are displayed as topics in the topic facet. Some feed items include a selectable link, such as a Uniform Resource Locator (URL). In a further embodiment, the part-of-speech tagger is run on the content located at the linked URL as well. The nouns in the content located at the linked URL are then aggregated with the nouns identified directly from the content of the feed items and the topic facet is generated as discussed.

The topic or topics of a feed item may not be included as a noun or noun phrase in the content of the feed item. In a still further embodiment, topics of feed items can be determined from content related to the feed item, as discussed further below with reference to FIG. 3 and such as described in commonly-assigned U.S. Patent Application, entitled "System and Method for Identifying Topics for Short Text Communications," Ser. No. 12/646,810, filed Dec. 23, 2009, pending, the disclosure of which is incorporated by reference. In yet another embodiment, any metadata tag information associated with the feed items can be used to generate topics either directly or added to the calculation of the top n nouns and noun phrases in the feed items.

The extracted facet information is then populated into the user interface as selectable elements along with the information feeds (block 206). A user selection of an element of a facet is received (block 208) and the facets and information feeds are updated in response to the selection (block 210), as discussed further below beginning with FIG. 4. Selection includes both selection and deselection of an element.

Figure 3:
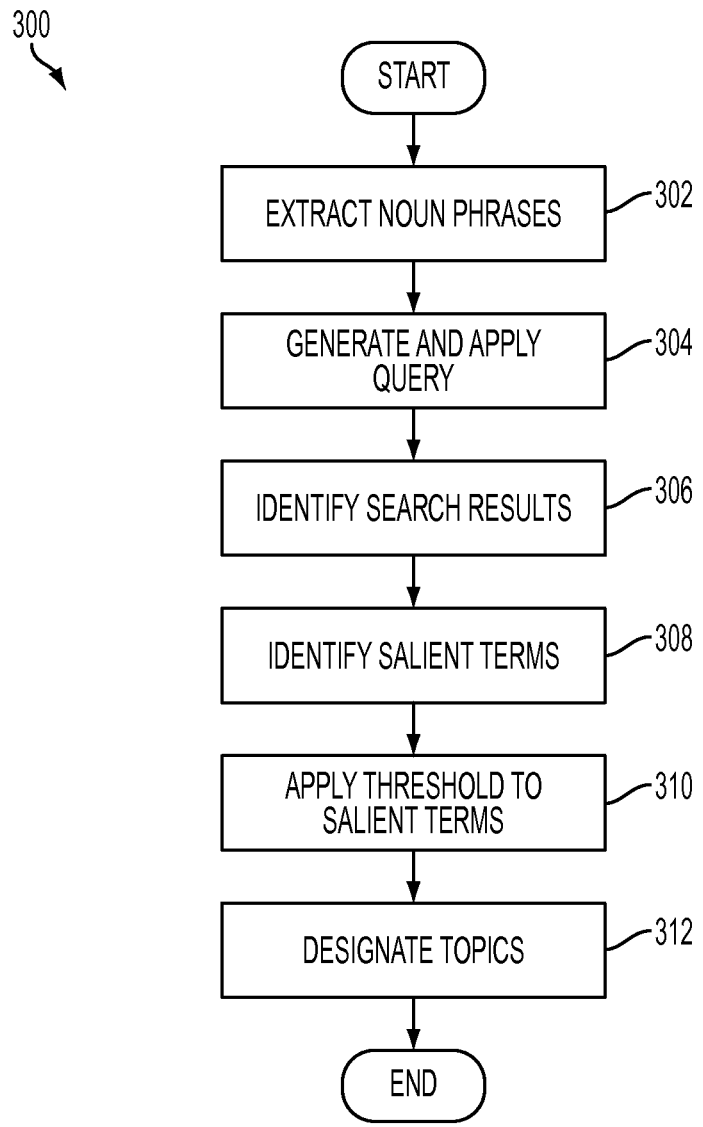
FIG. 3 is a flow diagram showing a method for identifying topics for feed items via related content, for use with the method of FIG. 2.

In one embodiment, topics for feed items can be identified using related content identified through a search query. FIG. 3 is a flow diagram 300 showing a method for identifying topics for feed items via related content, for use with the method of FIG. 2. Tokens, such as nouns, noun phrases, and root stems can be identified and extracted from the content of a feed item (block 302). Other tokens are possible. In one embodiment, the tokens can be identified by using a part-of-speech tagger. For example, a feed item, such as a tweet from Twitter, includes the message "awesome article on some SIGGRAPH user interface work: http://bit.ly/30MJY". The nouns "article," "SIGGRAPH," "user interface," and "work" are identified by the tagger. Other methods for identifying the nouns are possible. Additionally, grammar specifically related to a source of the feed item is analyzed. On Twitter, for example, abbreviations, such as "RT" for re-tweet can be removed, while "@ noun" can be converted into a proper noun. Other examples are possible.

The extracted noun phrases can then be used to form a search query for applying to a set of documents (block 304). The set of documents can include Web-based documents, or remotely or locally stored electronic documents. The search query can be executed through known search engines, such as Yahoo or Google, as well as through internal search engines. In one embodiment, all the identified tokens can be used for the query, while, in a further embodiment, a subset of the tokens can be selected, such as by a search engine, for generating the query. Other processes for identifying the subset of tokens are possible. The search query is generated by concatenating the tokens, which are sent to the search engine. Prior to conducting a search, the search engine can perform query transformation, rewording, or dropping of terms from the search query to provide results that are more closely related to the feed item.

The documents that match one or more tokens of the search query are identified as search results (block 306). The number of documents returned can based on a result threshold, which is determined automatically or designated by a user. The result threshold can include an absolute number, percentage, rank, score, or relevancy, as well as a combination of the thresholds. Other measures for determining the search results are possible. Alternatively, each of the search results must match all of the nouns in the query. Returning to the previous example, a result threshold of ten documents is applied with the search query to identify the search results. Thus, at a maximum, ten search results can be returned. The search results selected can be those documents that are the most relevant to the feed item, which can be indicated by high rank, score, or percentage of similarity with the tokens.

Once obtained, salient terms are identified for each search result (block 308). The search results can each be returned with a list of predetermined salient terms or alternatively, the salient terms can be subsequently identified using term frequency-inverse documents frequency ("tf-idf"). One or more salient terms are identified for each search result. If tf-idf is applied, the terms appearing in the search result with the highest tf-idf values can be selected as the salient terms.

A topic threshold is applied (block 310) to the salient terms for all the search results to identify one or more topics (block 312) based on the salient terms. The identified topics can include nouns originally identified in the feed item or salient terms identified in the related documents, but not the feed item.

In one embodiment, the topic threshold includes a majority-voting scheme in which each salient term is assigned votes and those salient terms that satisfy the threshold are designated as topics. Returning to the previous example, the topic threshold for identifying salient terms as topics is five or more votes. The ten search results are obtained along with the associated salient terms.

Each of the salient terms is assigned a voting score based on the number of search results in which the salient term is located. More specifically, a salient term is assigned one vote for each document that includes the term. For example, the salient term "computer graphics" appears in five search results. Accordingly, a voting score of five is assigned to the term "computer graphics." Since the five votes satisfies the topic threshold, the salient term "computer graphics" is identified as a topic for the feed item. The salient terms that do not satisfy the threshold can be stored as suggestions for topics.

In a further embodiment, different topic thresholds can be applied to salient terms that appear in the feed item and salient terms that are absent from the content of the feed item. A salient term identified can be verbatim to a noun in the feed item or can be a root stem of a noun in the feed item. More specifically, the topic threshold can be lower or more relaxed for the verbatim salient terms. Returning to the previous example, the topic threshold for salient terms not identified in the feed item is five or more votes, while the topic threshold for verbatim salient terms is three or more votes. Other topic threshold measures are possible. The salient term "SIGGRAPH" is located in the content of the feed item and thus, the verbatim topic threshold is applied. "SIGGRAPH" is identified in four search results. A voting score of four is assigned to the salient term "SIGGRAPH," which satisfies the threshold of three documents. Accordingly, "SIGGRAPH" is designated as a topic for the feed item.

At times, the search query may not return any related documents as search results. When no search results are returned, the search query can be modified. Terms in the query that are popular are removed and the modified query is again applied to find a set of documents.

Figure 4:
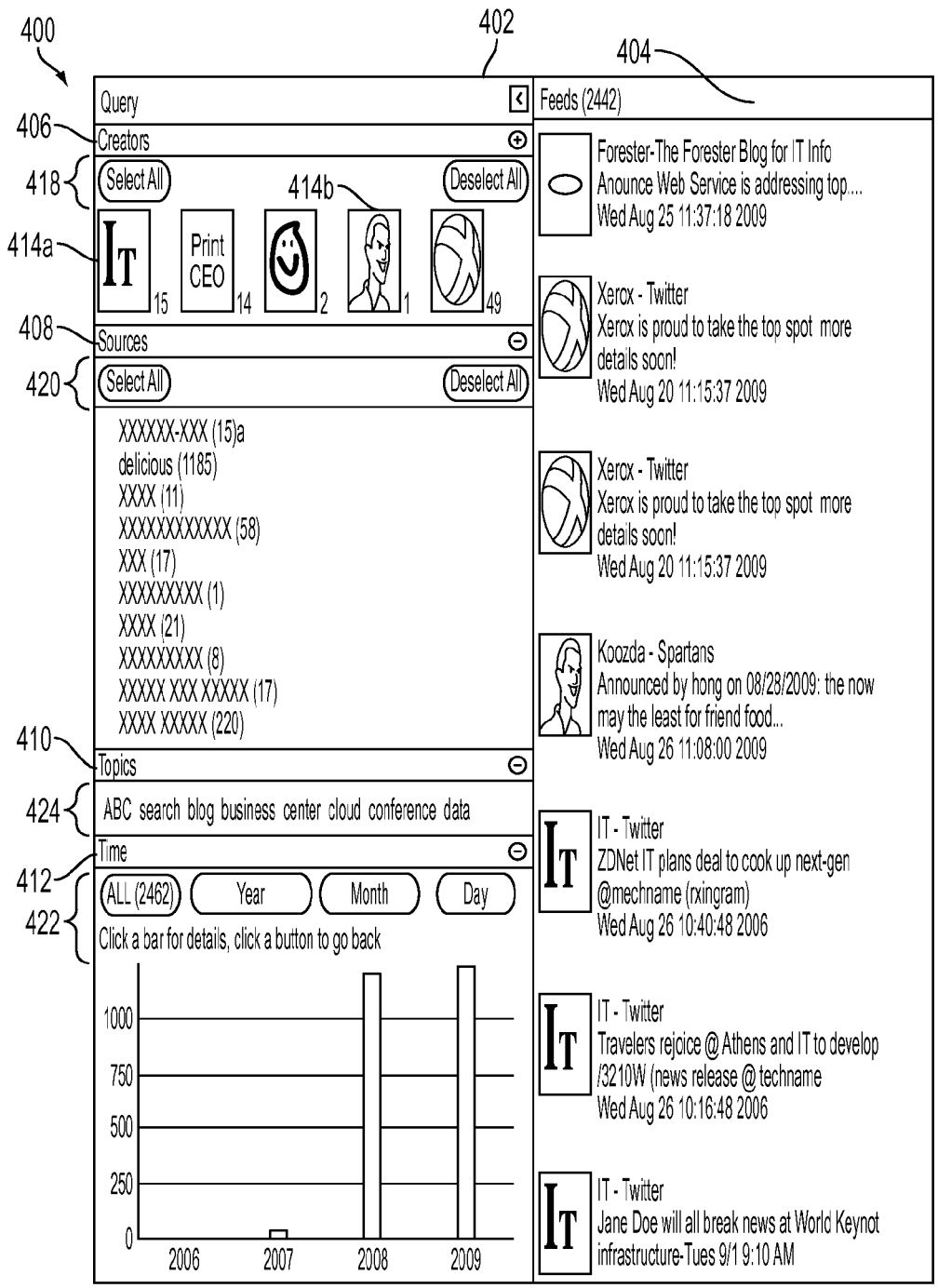
FIG. 4 is a screen shot diagram showing, by way of example, a first user interface for triaging of information feeds.

Large number of feeds can be difficult to manage and may prevent a user from quickly finding a desired feed item. The user can manage the feeds by creator, source, topic, or time using a faceted browser for filtering feed items and locating items of particular interest. The embodiments disclosed herein apply to all feed items received by a user or a subset of all feed items, such as only read or unread feed items, or only feed items received within a certain time frame. Such choices can be automated, preset, or user selectable options. FIG. 4 is a screen shot diagram 400 showing, by way of example, a user interface 402 for triaging of information feeds. User interface 402 can be implemented in a Web-based form, such as in a Web browser, or any other type of software interface. The user interface 402 includes an information stream feed list 404 and one or more user-interactive facets 406, 408, 410, 412 to filter the feed list 404 down to a desired subset. Facets 406, 408, 410, 412 are used to organize the feed list 404 using information extracted from the feed list 404, and can include a creator facet 406, source facet 408, topic facet 410, and time facet 412. Other facets are possible.

In one embodiment, feed items 404 are displayed in reverse chronological order in the right half and the facets 406, 408, 410, 412 are displayed in the left half of the user interface 402. Each of the facets 406, 408, 410, 412 is represented by user selectable elements, which can be associated with the number of feeds that are related to each user selectable element. The elements are individually selectable. Selection applies to both selection and deselection of the elements. User selection of an element filters out, or otherwise removes or "fades", all the feed items from the feed list 404 that do not match the selected element. Deselection of a previously selected element removes the filter applied based on the previous selection. The selection/deselection state of an element can be shown in other ways, such as differences in size, text, and color. Additionally, the facets 406, 408, 410, 412 are updated accordingly. In one embodiment, the default setting is that no elements are filtered out and all feed items are displayed in the feed list 404. In a further embodiment, one or more elements are automatically pre-filtered out by system default or by the user.

The creator facet 406 can include an icon 414a-b representative of the creator of a feed item, which can be an individual, corporate entity, or other creator. The number adjacent to the icon 414a-b indicates the number of feed items that specific creator has contributed to the feed list 404. User selection of one of the icons, 414b, dynamically updates the feed list 404 and facets 406, 408, 410, 412 to filter the feed items to only those produced by creator represented by the selected icon 414b, as discussed further below with reference to FIG. 5. Additionally, facets can include buttons 418, 420, or other selectable element, to select or deselect all of the elements in the facet.

The source facet 408 contains a list of sources of where the feed items in the feed list 404 were created or delivered from, for example Facebook or del.icio.us. One creator can supply feeds from more than one source and more than one creator can supply feeds from the same source. Selection of a source in the source facet 408 removes all the feed items from other sources from the feed list 404 and updates the facets 406, 408, 410, 412 accordingly, as further described below with reference to FIG. 6.

The topic facet 410 provides an overview of the content of the feed items. A predetermined number, of the topics identified from the feed items are displayed in the topic facet 410. The topics can be displayed, for example, as a list or tag cloud 424. Other types of topic display are possible. Each of the topics in the topic facet 410 is user selectable. Selecting a topic filters the feed items to display only the subset of feed items that contain the selected topic in the feed list 404, as further described below with reference to FIG. 7. The topics are generated from the content of the feed items, as further described above with reference to FIGS. 2 and 3. The topic facet 410 is dynamically updated and displays the topics determined from the remaining feed items and is generated in the same manner. The number of topics displayed depends on the predetermined number as previously discussed. Additional selection of topics further filters the feed items displayed. Selection of more than one topic can function either as an OR query, displaying feed items containing any of the selected topics, or an AND query, requiring all selected topics to be in the feed item for the item to be displayed. The other facets 406, 408, 412 are updated accordingly.

The time facet 412 aggregates and displays information about when the feed items were created. The user can select controls in the time facet 422 and view the feed items at a year, month, or day level. Other time periods are possible. Additionally, the user can choose to view all feed items. The controls in the time facet 422 also display the number of feed items associated with each time frame. The time information can be displayed as a bar graph, chronological list, or in another format. Selection by clicking a bar in the bar graph displays a more detailed view of the selection, for example, clicking a month will display a bar graph showing the days of the month and the number of feed items produced on each day. Further, a user selection of a particular time period filters out all feed items not created in that time period and only the feed items in that time period are displayed in the feed list 404.

Figure 5:
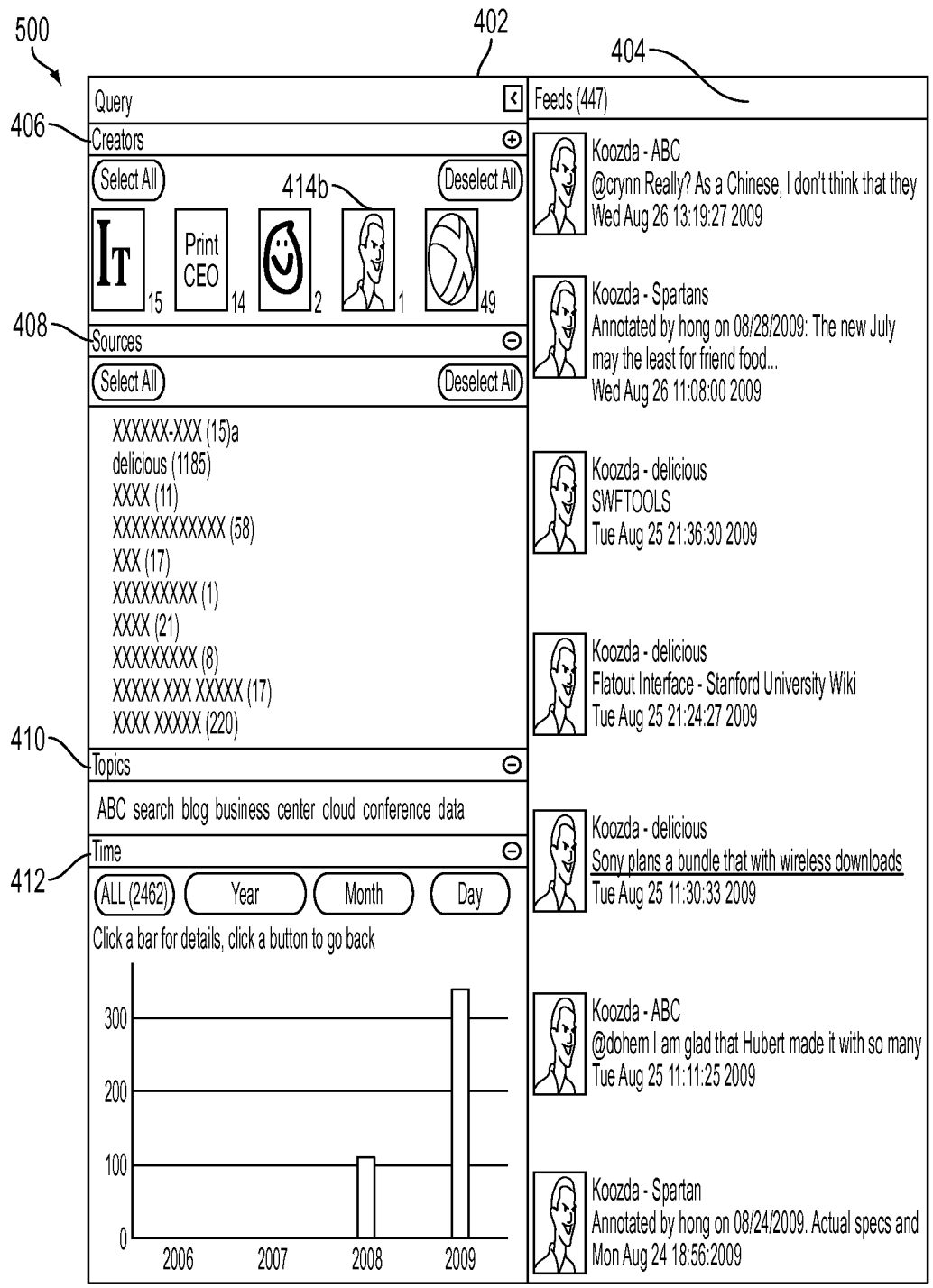
FIG. 5 is a screen shot diagram showing, by way of example, a second user interface for triaging of information feeds.

FIG. 5 is a screen shot diagram 500 showing, by way of example, a user interface 402 after selection of a creator from the creator facet 406. User selection of an icon 414b, representative of a creator, "Koozda", of one or more feeds in the feed list 404 filters out feeds created by other creators and displays only the feed items of the selected creator in the feed list 404. The selected icon 414b can be differentiated from the unselected icons. The differentiation can occur by highlighting, or otherwise drawing the user's focus to, the selected icon 414b. Conversely, the unselected icons can be faded, or otherwise have a reduced focus in the user interface 402. Other ways to differentiate are possible.

Figure 6:
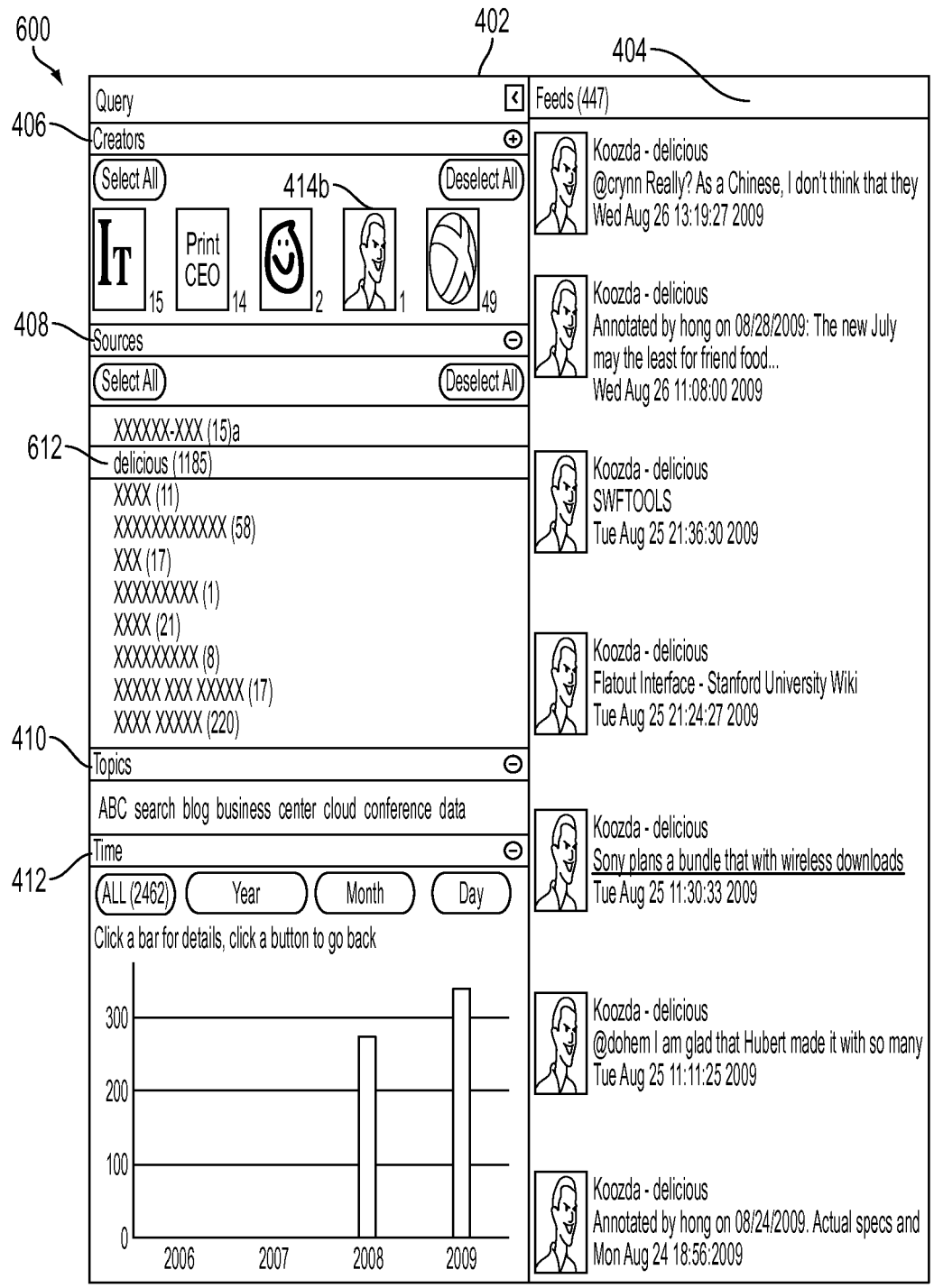
FIG. 6 is a screen shot diagram showing, by way of example, a third user interface for triaging of information feeds.

Combinations of selections from different facets add further filtering granularity. FIG. 6 is a screen shot diagram 600 showing, by way of example, the user interface of FIG. 5 using the source facet 408. Selecting a source filters all other feed items from the feed list 404 and displays only the feed items from the selected source. Selecting more than one source in the source facet 408 by the user displays feed items from each of the selected sources.

As shown in FIG. 6, selecting a source in combination with a selected creator, displays the feed items from the selected creator and source. For example, a previous user selection of creator "Koozda", as described further above with reference to FIG. 5, is combined with the source "delicious" 612, which is highlighted in the source facet 408. All other feed items are filtered from the feed list 404. Additionally, the facets 406, 408, 410, 412 have been updated to reflect the additional selection.

Figure 7:
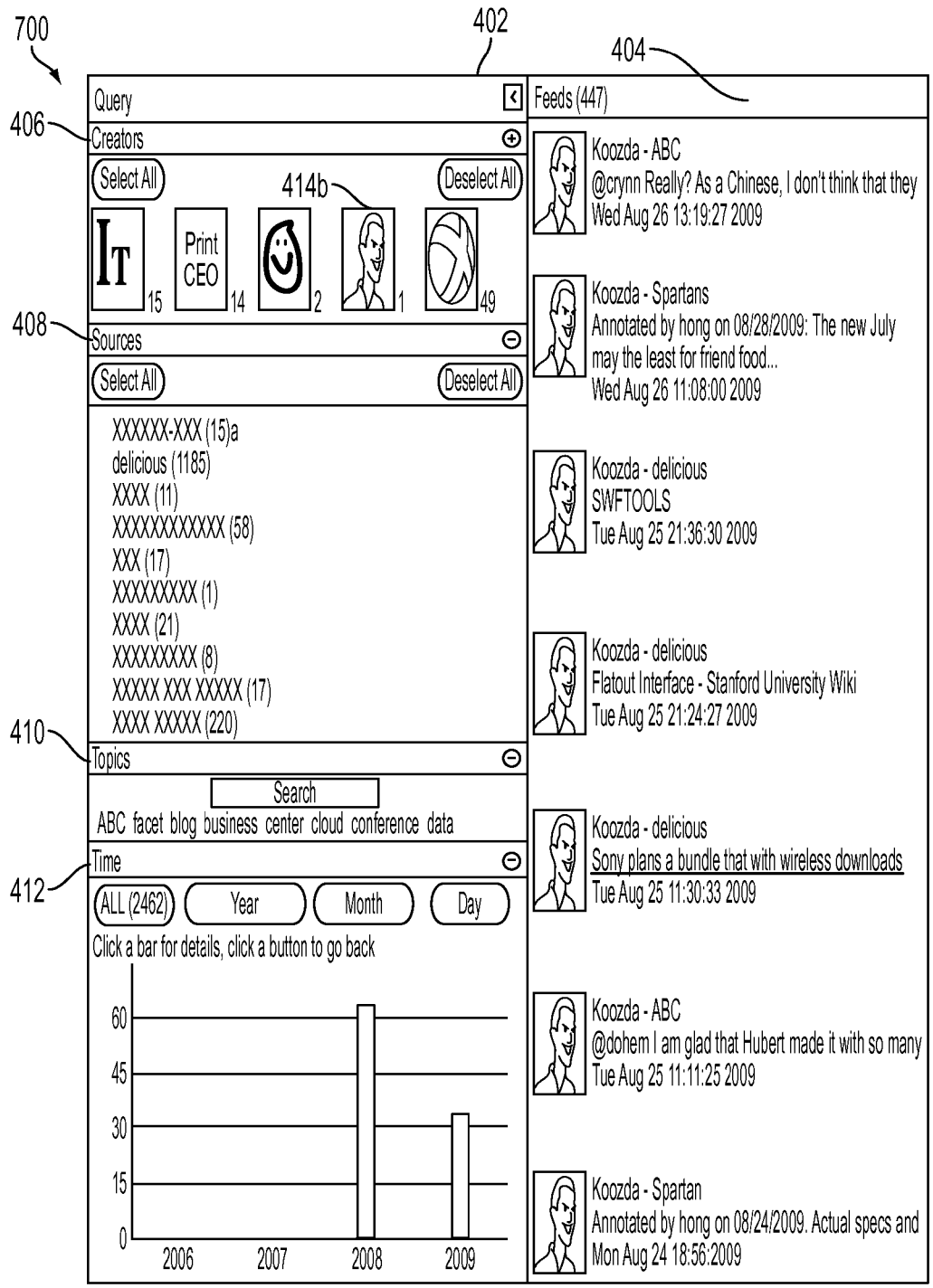
FIG. 7 is a screen shot diagram showing, by way of example, a fourth user interface for triaging of information feeds.

FIG. 7 is a screen shot diagram 700 showing, by way of example, the user interface of FIG. 4 using the topic facet 410. Topics are determined from the feed items, as discussed further above with reference to FIGS. 2 and 3. In a further embodiment, topics can be generated from any attached metadata tag associated with the feed item. The topic "search" has been selected from the topic facet 410 by the user. The topics can be displayed as a tag cloud or otherwise graphically, such as icons, or by text, such as a list of topics.

Other ways of displaying topics are possible. The selected topic is placed above the topic cloud along with an option to deselect the topic. Once a topic is selected, the feed items that have been associated with the selected topic remain in the feed list 404, while the other feed items are removed. If the selected topic appears in the content of the feed item, the topic can be highlighted or otherwise contrasted with the other content of the feed item. The topic facet 410 is updated to show the topics identified from the selected subset of feed items. Likewise, the other facets 406, 408, 412 are updated to reflect the selection. Additional topics, or elements of other facets 406, 408, 412 can then be selected to further filters the feed items. Whenever an element of a facet 406, 408, 410, 412 is selected the topics of the remaining feed items are determined, such as discussed above with reference to FIGS. 2 and 3, and the predetermined number to topics are then dynamically displayed in the topic facet 410.

While the invention has been particularly shown and described as referenced to the embodiments thereof, those skilled in the art will understand that the foregoing and other changes in form and detail may be made therein without departing from the spirit and scope of the invention.

What is claimed is:

1. A system for triaging information feeds, comprising:
   a processor to execute the following:
   a feed module to receive a plurality of information feeds, wherein each information feed comprises at least one or more feed items;
   a facet identification module to generate one or more facets wherein the facets comprise at least one of a creator facet comprising creators, a source facet comprising sources, and a time facet comprising times by directly extracting the creators, sources and times from each of the feed items and by generating a topic facet comprising at least one topic for each feed item based on at least one of nouns and noun phrases associated with that feed item and designating the nouns and noun phrases as the topics for that feed item;
   a presentation module to display within a user interface, the creator, source, time and topic facets;
   a topic selection module to receive from the user a selection of one of the plurality of topics from the topic facet displayed within the user interface;
   a display module to display only the feed items that are associated with the selected topic within the user interface and to update the topics in the topic facet displayed within the user interface by presenting for display only those topics that are associated with the displayed feed items; and
   a facet update module to filter in or filter out one or more of the extracted creators, sources, and times within the display of the user interface based on the feed items associated with the selected topic in the user interface.

2. A system according to claim 1, further comprising:
   an extraction module to extract at least one of creator, source, and time from the feed items of the information feed, wherein the presentation module further presents the at least one of extracted creator, source, and time in a creator facet, source facet, and time facet respectively.

3. A system according to claim 2, further comprising:
   an element selection module to receive a user selection of an element in one of the creator facet, source facet, and time facet, wherein the update module further updates the user interface to display only the feeds that contain the selected element.

4. A system according to claim 1, wherein the at least one topic is identified from one of content of the information feed, content related to the information feed, and tag metadata associated with the information feed.

5. A system according to claim 1, further comprising:
a part-of-speech tagger to identify at least one noun or noun phrase in each of the information feeds;
aggregating the occurrences of each of the nouns or noun phrases across all information feeds;
displaying a predetermined number of the nouns or noun phrases with the highest occurrences as the topics in the topic facet.

6. A system according to claim 1, further comprising:
a token extraction module to extract tokens from the information feed;
a query module to generate a query using the extracted tokens and applying the query to a set of documents;
a result identification module to identify those documents in the set that match the query as search results;
a threshold module to identify salient terms associated with each of the search results and apply a threshold to the identified salient terms; and
a topic module to select the salient terms that satisfy the threshold as topics for the information feed.

7. A system according to claim 6, further comprising:
a part-of-speech tagger to identify the tokens.

8. A system according to claim 6, further comprising:
a concatenation module to concatenate the extracted tokens to form the query.

9. A system according to claim 6, wherein the set of documents comprise Web-based documents.

10. A system according to claim 6, wherein the topics comprise at least one of a token identified in the information feed and a token absent from the information feed.

11. A method for triaging information feeds, comprising:
receiving a plurality of information feeds, wherein each information feed comprises at one or more feed items;
determining one or more facets for each feed item, comprising:
generating the one or more facets comprising at least one of a creator facet comprising creators, a source facet comprising sources, and a time facet comprising times by directly extracting the creators, sources and times from each of the feed items; and
generating a topic facet comprising at least one topic for each feed item based on at least one of nouns and noun phrases included in that feed item and designating the nouns and noun phrases as the topics for that feed item;
displaying within a user interface, the creator, source, time and topic facets;
receiving from the user a selection of one of the plurality of topics from the topic facet displayed within the user interface;
displaying only the feed items that are associated with the selected topic within the user interface;
updating the topics in the topic facet displayed within the user interface by presenting for display only those topics that are associated with the displayed feed items; and
filtering in or filtering out one or more of the extracted creators, sources, and times within at least one of the creator, source and time facets in the display of the user interface based on the feed items associated with the selected topic.

12. A method according to claim 11, further comprising:
extracting at least one of creator, source, and time from the feed items of the information feed; and
presenting the at least one of extracted creator, source, and time in a creator facet, source facet, and time facet respectively.

13. A method according to claim 12, further comprising:
receiving a user selection of an element in one of the creator facet, source facet, and time facet; and
updating the user interface to display only the feeds that contain the selected element.

14. A method according to claim 11, wherein the at least one topic is identified from one of content of the information feed, content related to the information feed, and tag metadata associated with the information feed.

15. A method according to claim 11, further comprising:
identifying at least one noun or noun phrase in each of the information feeds;
aggregating the occurrences of each of the nouns or noun phrases across all information feeds; and
displaying a predetermined number of the nouns or noun phrases with the highest occurrences as the topics in the topic facet.

16. A method according to claim 11, further comprising:
extracting tokens from the information feed;
generating a query using the extracted tokens and applying the query to a set of documents;
identifying those documents in the set that match the query as search results;
identifying salient terms associated with each of the search results and applying a threshold to the identified salient terms; and
selecting the salient terms that satisfy the threshold as topics for the information feed.

17. A method according to claim 16, further comprising:
applying a part-of-speech tagger to the information feed to identify the tokens.

18. A method according to claim 16, further comprising:
concatenating the extracted tokens to form the query.

19. A method according to claim 16, wherein the set of documents comprise Web-based documents.

20. A method according to claim 16, wherein the topics comprise at least one of a noun identified in the information feed and a noun absent from the information feed.

21. A system according to claim 1, further comprising:
an element addition module to receive a selection of one of the elements, to add the feed items that are associated with the selected element to the feed items displayed within the user interface, and to filter in one or more of the elements based on the added feed items; and
an element removal module to deselect a selected element, to remove the feed items that are associated with the deselected element from the user interface, and to filter out one or more of the elements displayed with the other remaining facets based on the removed feed items.

22. A method according to claim 11, further comprising at least one of:
receiving a selection of one of the elements, adding the feed items that are associated with the selected element to the feed items displayed within the user interface, and filtering in one or more of the elements based on the added feed items; and
deselecting a selected element, removing the feed items that are associated with the deselected element from the user interface, and filtering out one or more of the elements displayed with the other remaining facets based on the removed feed items.

* * * * *